United States Patent [19]
Poon et al.

[11] Patent Number: 5,940,380
[45] Date of Patent: Aug. 17, 1999

[54] METHOD AND ARRANGEMENT RELATING TO RADIO COMMUNICATION NETWORKS

[75] Inventors: Kar-Fat Poon, Vellinge; Lars Wilhelmsson, Lund, both of Sweden

[73] Assignee: Telefonaktiebolaget LM Ericsson, Stockholm, Sweden

[21] Appl. No.: 08/879,195

[22] Filed: Jun. 19, 1997

[30] Foreign Application Priority Data

Jun. 20, 1996 [SE] Sweden .................................. 9602459

[51] Int. Cl.$^6$ ............................ H04B 7/208; H04B 7/212
[52] U.S. Cl. ...................... 370/330; 370/331; 370/436; 370/458; 455/450; 455/464
[58] Field of Search .................................... 370/328, 329, 370/330, 331, 336, 337, 347, 348, 442, 341, 436, 437, 458; 455/422, 436, 447, 448, 450, 452, 464, 509, 517, 528

[56] References Cited

U.S. PATENT DOCUMENTS

| | | | |
|---|---|---|---|
| 5,117,502 | 5/1992 | Onoda et al. | 455/436 |
| 5,189,734 | 2/1993 | Bailey et al. | 455/422 |
| 5,396,496 | 3/1995 | Ito et al. | 370/330 |
| 5,416,778 | 5/1995 | Chan et al. | 370/330 |
| 5,483,668 | 1/1996 | Malkamaki et al. | 370/331 |
| 5,711,003 | 1/1998 | Dupuy | 455/436 |
| 5,745,695 | 4/1998 | Gilchrist et al. | 370/330 |
| 5,757,787 | 5/1998 | Dent | 370/330 |

FOREIGN PATENT DOCUMENTS

WO94/13113 6/1994 WIPO .
WO94/28643 12/1994 WIPO .

OTHER PUBLICATIONS

International Search Report dated Apr. 14, 1997.

Michel Mouly and Marie-Bernadette Pautet, The GSM System for Mobile Communications, pp. 330–341.

*Primary Examiner*—Chi H. Pham
*Assistant Examiner*—Ricky Ngo
*Attorney, Agent, or Firm*—Burns, Doane, Swecker & Mathis, L.L.P.

[57] ABSTRACT

The invention provides a communication unit (MS1), communicating with a first radio base station (BTS1) on a dedicated communication channel (CH1) in a radio communication network (NET1) using a combination of TDMA and FDMA, with an increased flexibility in terms of when the communication unit (MS1) can receive signals from a second base station (BTS4). The increased flexibility is achieved by the communication unit (MS1) selecting some of the time slots comprising the dedicated communication channel (CH1) and ignoring to communicate with the first radio base station in these selected time slots and instead using them to receive signals (BCCH4) from the second radio base station (BTS4). In a GSM mobile station (MS1) according to the invention, the "stolen" time slots are used for identification of a neighboring base tranceiver station (BTS4), i.e. for detection and decoding of the frequency correction channel and synchronization channel, resulting in faster identification and thus enabling the mobile station (MS1) to perform handover faster.

14 Claims, 11 Drawing Sheets

5,940,380

METHOD AND ARRANGEMENT RELATING TO RADIO COMMUNICATION NETWORKS

TECHNICAL FIELD OF THE INVENTION

The invention relates to a radio communication network having communication channels for communicating digital or digitized information between base stations and communication units by transmitting digitally modulated radio signals in a combination of frequency division multiplex and time multiplex. More precisely the invention relates to a method to be implemented in a communication unit, increasing the flexibility in how time is used.

DESCRIPTION OF RELATED ART

In a GSM network (Global System for Mobile communications) it is fundamental that a communication unit, i.e. a mobile station, with an established call having an allocated radio communication channel, should be able to maintain the established call when moving from one cell served by a first base (tranceiver) station, i.e. the serving base station, to a second cell served by a second base station. To maintain the established call, a new communication channel in the second cell must be allocated to the call. The process by which a mobile station is able to maintain an established call when moving within a GSM network is called handover.

To be able to perform handover, the mobile station must first determine that the signal strength of the second base station makes it a suitable candidate for handover. In order to ensure a reliable handover, the GSM technical specifications also requires the mobile station to identify the second base station.

In a GSM network, time is divided into time slots and TDMA frames i.e. a group of eight time slots. A communication channel in GSM comprises a succession of time slots defined by a sequence of frames and a certain time slot number within each frame. The mobile station is busy communicating with the first base station in every TDMA frame except during idle frames occuring once every 26th frame. During these idle frames the identification of the second base station takes place. A detailed account for the identification process can be found in either the GSM technical specifications or M. Mouly and M. B. Pautet 'The GSM System for Mobile Communications' pages 330–341.

Due to the mobile station only being able to use the idle frames for identification of the second base station, the identification process takes a significant amount of time, typically around four seconds. In certain situations, e.g. when a user turns around the corner in a high-rise city area or enters an underground railway station, handover to a second base station must be performed very quickly if the call is to be maintained, since the quality of the radio connection between the mobile station and the serving base station deteriorates very quickly. In such situations, it is important that the time needed to make preparations for handover, including identification of the second base station, is as short as possible.

U.S. Pat. No. 5,189,734 describes a cellular radio system in which a base station in communication with a mobile requests base stations of a subset of adjacent cells to reserve a channel, so that in the event of handover to a base station in one of these cells this can be executed quicker than if reservation had not been made.

U.S. Pat. No. 5,117,502 describes a mobile radio communication system in which a mobile station in communication with a first base station measures the strength of signals received from base stations neighboring the first base station during free time slots, i.e. time slots unused by the mobile station for communication.

SUMMARY OF THE INVENTION

The general problem dealt with by the present invention is to provide a communication unit, communicating with a first radio base station on a dedicated communication channel in a radio communication network using time division multiple access, with an increased flexibility in terms of when the communication unit can receive signals from a second base station.

The problem is solved essentially by a method in which the communication unit ignores to communicate with the first base station in certain time slots assigned to said dedicated communication channel, and instead uses those time slots to receive signals from the second base station. The problem solution includes a communication unit with the means necessary to implement the method.

More specifically, the problem is solved in the following manner. The communication unit selects at least one of the time slots in the succession of time slots comprising the dedicated communication channel. In the selected time slot, the communication unit blocks communication, i.e. ignores to communicate, with the first base station on the dedicated communication channel. The communication unit further selects a radio frequency, different from the radio frequency associated with the selected time slot for communication on the dedicated communication channel, and receives in the selected time slot signals on the selected frequency from the second base station.

A general object of the invention is to provide the communication unit with a higher degree of flexibility in deciding when to receive signals from other base stations.

A more specific object of the invention when implementing the method in a communication unit of GSM-type or of a type derived from GSM (e.g. DCS1800), is to speed up the process of identifying base stations that are considered as suitable handover candidates.

A general advantage afforded by the invention is that a communication unit is provided with a higher degree of flexibility in deciding when to receive signals from other base stations.

A more specific advantage afforded by the invention is that by implementing this method in a communication unit (mobile station) of GSM-type or of a type derived from GSM, the time needed for the process of identifying base stations considered as suitable handover candidates can be cut shorter. This enables the communication unit to perform handover faster and results in a much better chance of maintaining an established call in situations where rapid handover is critical.

The invention will now be described more in detail below with reference to the appended drawings.

DETAILED DESCRIPTION OF THE EMBODIMENTS

Figure 1:
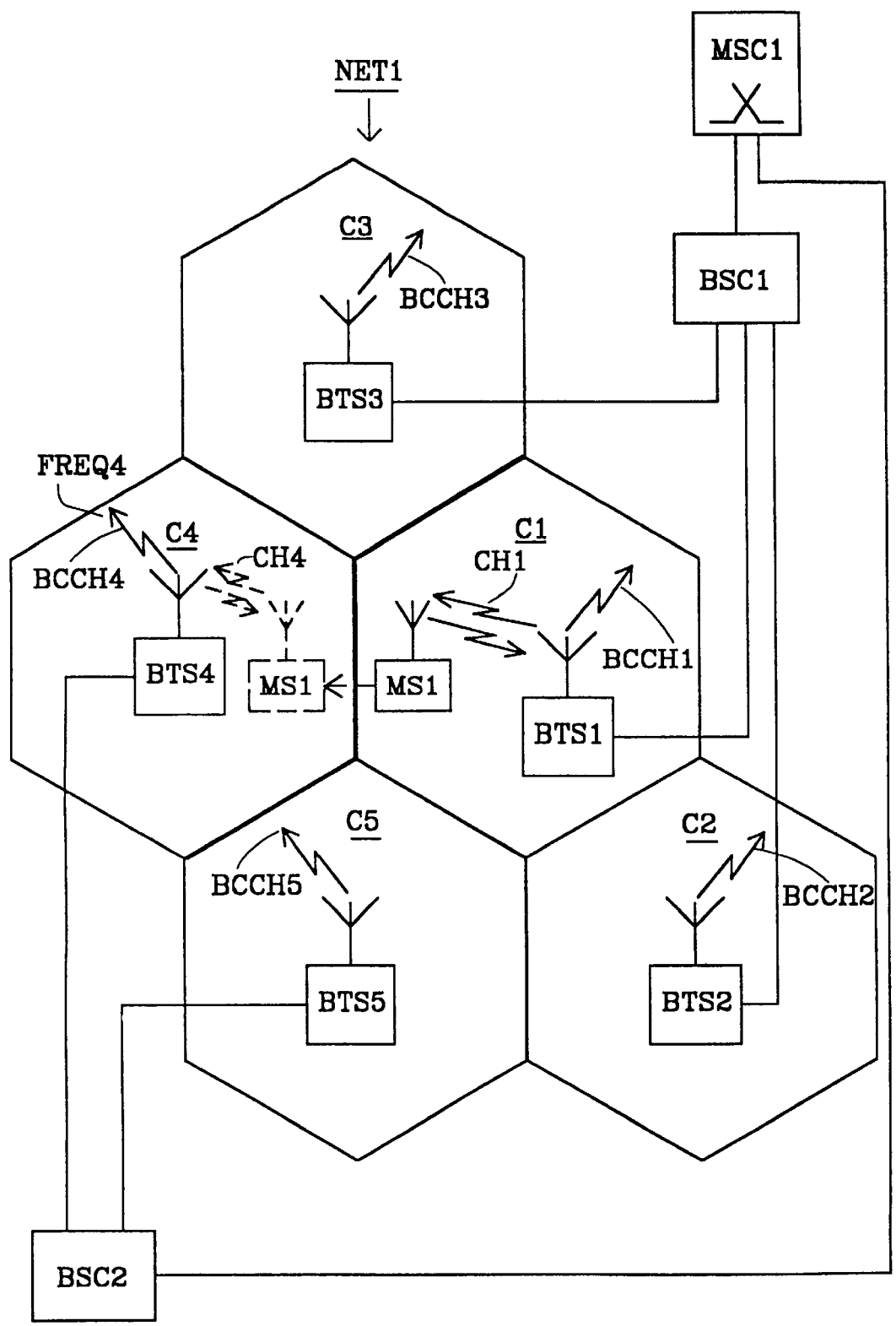
FIG. 1 is a schematic view of a portion of a GSM network.

FIG. 1 illustrates a portion of a GSM network NET1. The geographic area covered by the network NET1 is divided into cells C1–C5. Each cell C1–C5 provides radio coverage in a certain area and is allocated a certain set of frequencies for communication in that area.

Each cell C1–C5 is served by one base station, called base tranceiver station (BTS) in GSM terminology, BTS1–BTS5 with means for transmitting to and receiving from a communication unit, called mobile station (MS) in GSM terminology, MS1 currently located in the cell. The cell C1 in which the mobile station MS1 is currently located is called the serving cell and the base tranceiver station BTS1 serving that cell is called the serving base tranceiver station.

The mobile station MS1 comprises means for communication with base tranceiver stations BTS1–BTS5 in the network and is used by a subscriber to get access to the communication services provided by the GSM network NET1. A group of base tranceiver stations is controlled by a base station controller (BSC) BSC1–BSC2. A number of base station controllers BSC1–BSC2 are controlled by a mobile services switching centre (MSC) MSC1. The mobile services switching centre MSC1 is responsible for switching calls to and from mobile stations located in the area served by the mobile services switching centre.

When a call is being established to or from the mobile station MS1, a communication channel CH1 dedicated for communication between the mobile station MS1 and the serving base tranceiver station BTS1 is allocated for the call. If the mobile station MS1 moves during the call into another cell C4, a new dedicated communication channel CH4 must be allocated in that cell C4 in order to maintain the established call. The base tranceiver station BTS4 serving that other cell C4 becomes the new serving base tranceiver station and the old communication channel CH1 is released. This process of changing communication channel for a call when the mobile station MS1 moves into another cell C4 is called handover.

The channel organization of GSM is based on a combination of Time Division Multiple Access (TDMA) and Frequency Division Multiple Access (FDMA). In the frequency domain, communication occurs on different radio frequencies. The available frequency space is divided amongst a number of carriers with carrier spacing 200 kHz. Time is divided into time slots. Each time slot has a duration of ~577 $\mu$s.

Figure 2:
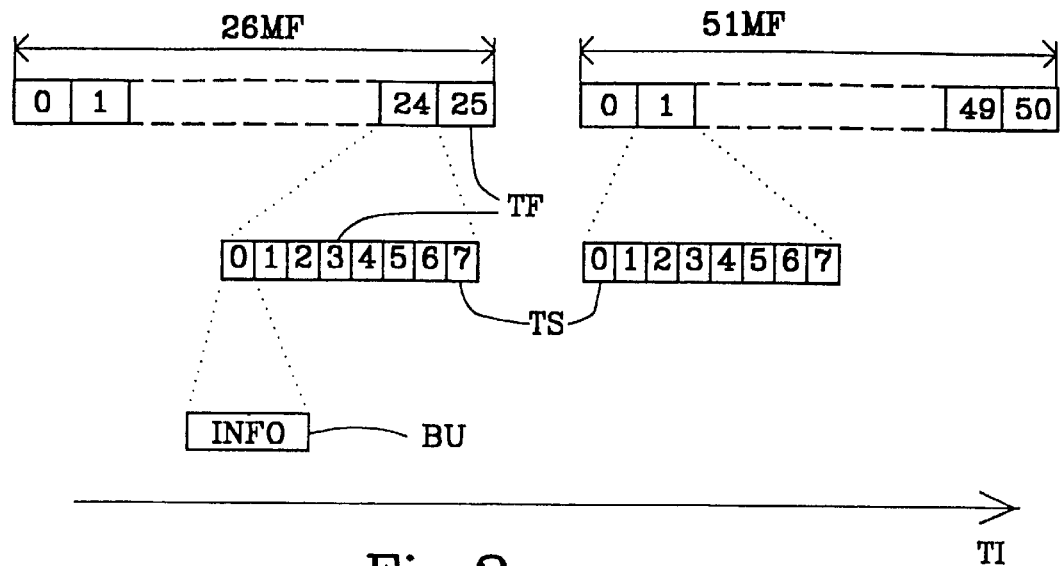
FIG. 2 is a time diagram illustrating the grouping of time slots, TDMA frames and multiframes in GSM.

FIG. 2 illustrates how in the time domain TI, time slots TS are grouped into TDMA frames TF consisting of eight time slots each. TDMA frames are further grouped into two types of multiframes: 26-frame multiframe 26MF comprising 26 TDMA frames and 51-frame multiframe 51MF comprising 51 TDMA frames. Each TDMA frame is assigned a frame number. Frame numbers are unique within the context of a hyperframe consisting of 2 715 648 TDMA frames.

In a time slot TS on a certain carrier, information INFO is sent/received as a burst BU. There are different types of bursts, normal burst (NB), frequency correction burst (FB), synchronization burst (SB), access burst (AB) and dummy burst.

Information is exchanged in both the downlink direction, i.e. transmission from the base tranceiver station to the mobile station and the uplink direction, i.e. transmission from the mobile station to the base tranceiver station.

Figure 3A:
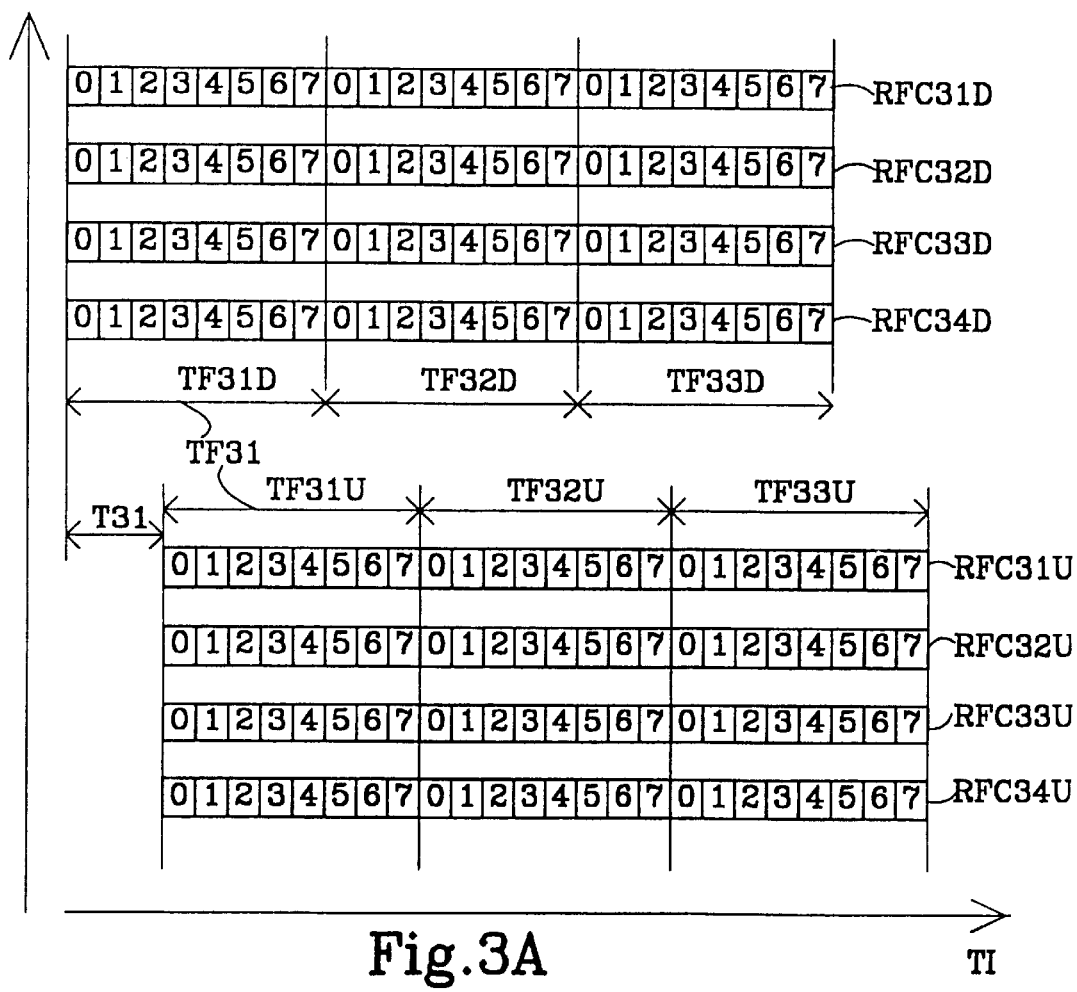
FIG. 3A is a time-frequency diagram illustrating the relationship between radio frequency channels and TDMA frames on the downlink and uplink in GSM.

FIG. 3A shows how in the frequency domain FREQ, different radio frequencies are used for the downlink RFC31D–RFC34D and uplink direction RFC31U–RFC34U respectively. In the time domain TI, TDMA frames in the downlink TF31D–TF33D and uplink TF31U–TF33U are shifted in time relative each other. At the base tranceiver station, a TDMA frame on the uplink TF31U is delayed by a fixed time period T31 of three time slots from the start of the TDMA frame on the downlink TF31D. At the mobile station, the delay will be variable to allow adjustment for signal propagation delay (frame alignment). For each TDMA frame in the downlink TF31D–TF33D, there is a TDMA frame in the uplink direction TF31U–TF33U that is assigned the same TDMA frame number. When a mobile station is said to be receiving and transmitting in a certain TDMA frame TF31, this really means receiving in a TDMA frame on the downlink TF31D and transmitting in another TDMA frame on the uplink TF31U where both frames have the same frame number.

A physical channel is defined in GSM as a sequence of TDMA frames, a time slot number (modulo 8) and a frequency hopping sequence i.e. a physical channel comprises a succession of time slots defined by the sequence of TDMA frames and a certain time slot position within each TDMA frame, each individual time slot being associated with a radio frequency as determined by the frequency hopping sequence. For a physical channel not using frequency hopping, all time slots in one direction, i.e. downlink or uplink, will be associated with one and the same frequency.

Physical channels in GSM are bidirectional allowing information transfer both in the downlink and uplink direction. The uplink frequency is related to the downlink frequency by a fixed frequency offset. Each such pair of downlink and uplink frequency constitutes a radio frequency channel.

Figure 3B:
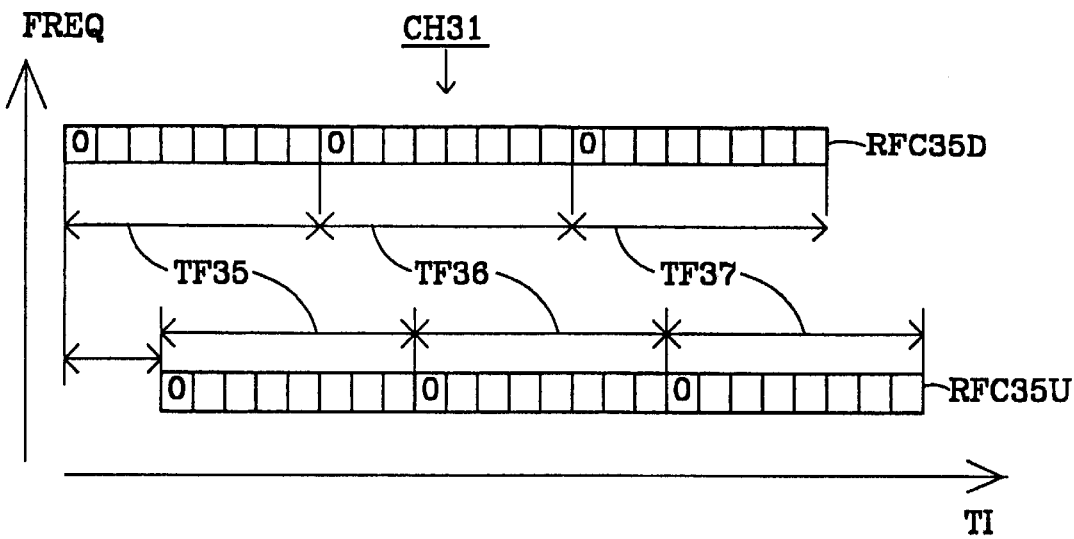
FIG. 3B is a time-frequency diagram illustrating a physical channel when frequency hopping is not used.

FIG. 3B shows an example of a physical channel CH31 when frequency hopping is not used. In the time domain TI the channel CH31 uses time slot zero 0 in a sequence comprising three TDMA frames TF35–TF37. In the frequency domain FREQ, one radio frequency channel is used i.e. one radio frequency RFC35D is used in the downlink and another one RFC35U is used in the uplink.

Figure 3C:
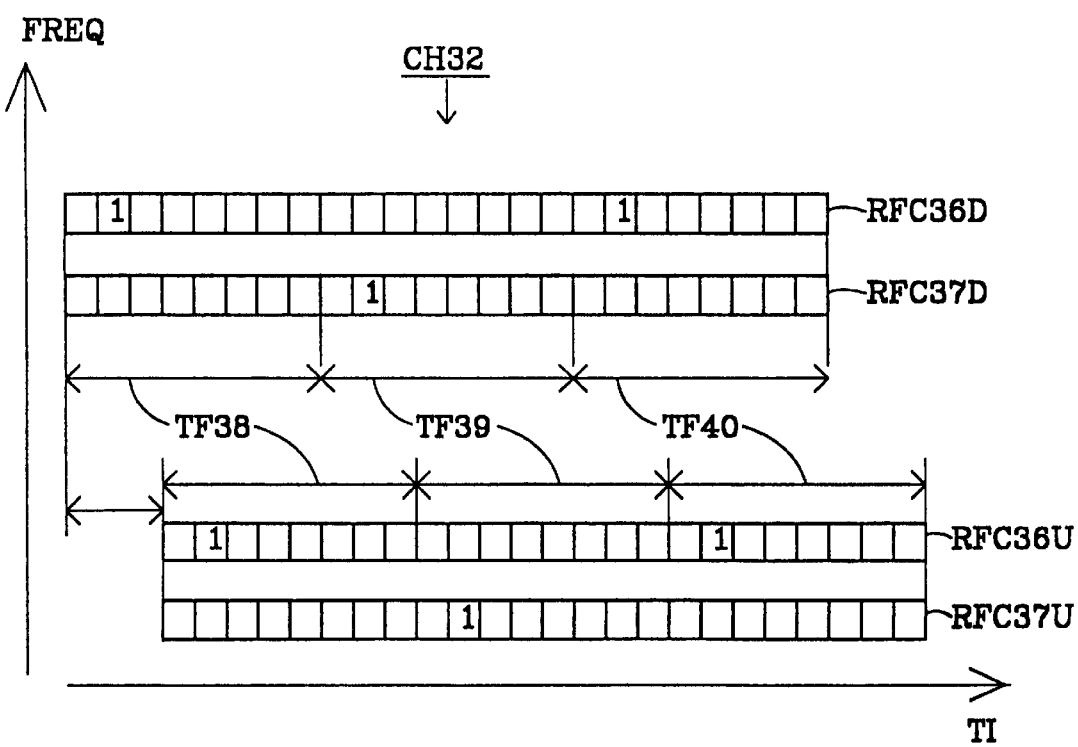
FIG. 3C is a time-frequency diagram illustrating a physical channel when using frequency hopping.

FIG. 3C illustrates another example of a physical channel CH32 using frequency hopping. In the time domain TI the channel CH32 uses time slot one 1 in a sequence comprising three TDMA frames TF38–TF40. In the frequency domain FREQ two radio frequency channels are used i.e. two radio frequencies are used both in the downlink RFC36D–RFC37D and uplink RFC36U–RFC37U direction. The radio frequency used for transmission in each time slot is changed between time slots.

In each cell C1–C5 (FIG. 1) one of the radio frequency channels is called a BCCH-carrier BCCH1–BCCH5.

A number of logical channels are defined.

The frequency correction channel (FCCH) carries information for frequency correction of the mobile station.

The synchronization channel (SCH) carries information for frame synchronization (TDMA frame number) of the mobile station and identification of a base tranceiver station (base tranceiver station identity code-BSIC).

The broadcast control channel (BCCH) broadcasts general information on a base tranceiver station per base transceiver station basis.

The common control channel (CCCH) consists of a group of channels used in the downlink direction for paging mobiles and allocating dedicated channels to mobile stations, and in the uplink direction to request allocation of dedicated channels.

The traffic channel (TCH) is used to carry user information (speech or data). There is a whole set of different traffic channels classified as full or half rate and according to the type of user information carried e.g. full rate traffic channel for speech (TCH/FS) and half rate traffic channel for 4.8 kbit/s user data (TCH/H4.8).

For each traffic channel, there is a slow associated control channel (SACCH/T) used in the downlink direction for example to order change of output power and in the uplink direction to report results of signalling strength measurements on neighbouring base tranceiver stations.

Figure 4:
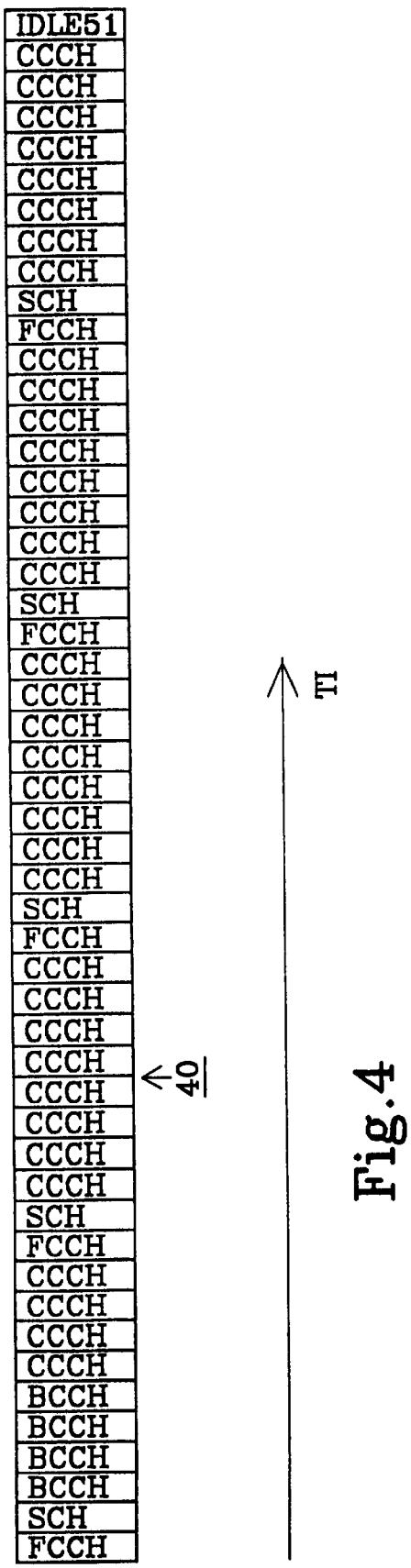
FIG. 4 is a time diagram illustrating the mapping of logical channels frequency correction channel, synchronization channel, common control channel and broadcast control channel on a 51-frame multiframe.
Figure 5:
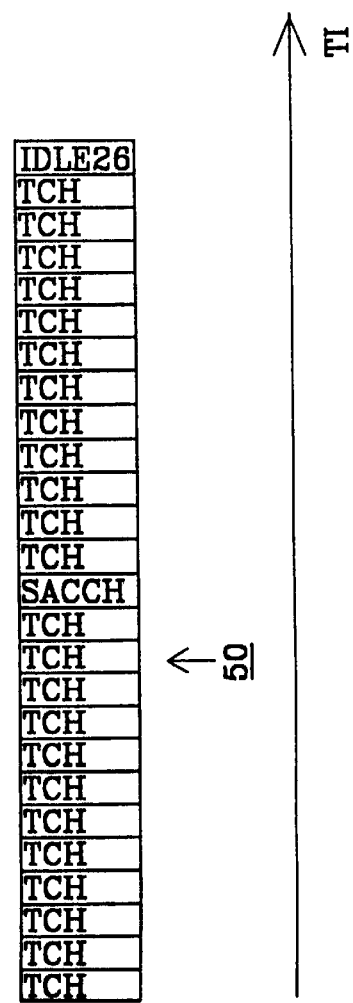
FIG. 5 is a time diagram illustrating the mapping of a fullrate traffic channel and its associated slow associated control channel on a 26-frame multiframe.

Different combinations of logical channels are defined and mapped onto physical channels. FIGS. 4 and 5 contain examples on how logical channels are mapped onto TDMA frames in the time domain TI.

FIG. 4 illustrates one of the defined mappings 40 consisting of frequency correction channel FCCH, synchronization channel SCH, broadcast control channel BCCH and common control channel CCCH mapped together onto a 51-frame multiframe. This mapping 40 is used in the downlink direction and the physical channel used is timeslot zero in every TDMA frame on the BCCH-carrier. The last frame IDLE51 in the 51-frame multiframe is idle, i.e. there is no logical channel mapped onto that frame.

FIG. 5 illustrates another of the defined mappings 50 consisting of a fullrate traffic channel TCH together with its slow associated control channel SACCH mapped onto a 26-frame multiframe. For this mapping 50, the last TDMA frame IDLE26 in each multiframe is idle, i.e. no information is sent or received in that frame. This mapping 50 is used in both the downlink and uplink direction. A multitude of different physical channels can be used to carry this mapping 50. The idle frame IDLE26 is not included in the sequence of TDMA frames comprising the physical channel, i.e. there is no time slot assigned to the the physical channel used in the idle frame IDLE26.

Further details on the GSM channel structures can be found in GSM technical specifications 05.01 and 05.02.

In GSM, the decision by a base station controller BSC1 (FIG. 1) to initiate handover of a mobile station MS1 to another cell C4 is in part based upon measurement results reported by the mobile station MS1 on the signal strength of the downlink BCCH-carriers BCCH2–BCCH5 in neighbouring cells C2–C5. A prerequisite for the possibility to handover the mobile station MS1 to another cell C4, is that the averaged signal strength for the BCCH-carrier BCCH4 of that cell C4 has been reported by the mobile station MS1 to the base station controller BSC1.

The downlink BCCH-carriers BCCH1–BCCH5 in all cells C1–C5 are each continuously transmitted on all time slots and without variation of RF level. This enables a mobile station MS1 to measure the signal strength of the BCCH-carrier BCCH4 in a cell C4 whenever it needs to.

When a traffic channel has been allocated to a mobile station MS1, the mobile station MS1 is required to measure the strength of the received signal for all downlink BCCH-carriers BCCH2–BCCH5 in the BCCH Allocation (BA) list received from the serving base tranceiver station BTS1. The BCCH-carriers BCCH2–BCCH5 in the BA list are measured one after the other. Measurements are carried out in almost every TDMA frame between the transmit and receive time slots on the allocated physical channel CH1 carrying the traffic channel and its slow associated control channel. The measurement results for each BCCH-carrier BCCH2–BCCH5 are averaged over a period of one slow associated control channel multiframe, i.e. 104 TDMA frames for a traffic channel associated slow associated control channel.

In order to ensure reliable handover, the GSM specifications require the mobile station MS1 to identify what base tranceiver station BTS4 is being measured before reporting the measurement results for a certain BCCH-carrier BCCH4. In order to identify a base tranceiver station BTS4, the mobile station MS1 must obtain synchronization with that base tranceiver station BTS4. Obtaining synchronization with a base tranceiver station BTS4 is a two step process. First the mobile station MS1 detects and decodes the frequency correction channel FCCH (FIG. 4) to obtain a rough idea of the timing of timeslot zero on the BCCH-carrier BCCH4 (FIG. 1). In the second step, the mobile station MS1 detects and decodes the synchronization channel SCH (FIG. 4). The synchronization channel carries information on the identity of the base tranceiver station BTS4 (BSIC-Base Station Identity Code), so after decoding this channel, the mobile station MS1 knows the identity of the base tranceiver station BTS4.

It is during idle frames in the 26-frame multiframe structure used for the traffic channel that the mobile station MS1 tries to detect the frequency correction channel and synchronization channel of neighbouring base tranceiver stations BTS2–BTS5. However, it is only when one of these idle frames coincides in time with a TDMA frame used for the frequency correction channel or the synchronization channel by a neighbouring base tranceiver station BTS2–BTS4, that the mobile station MS1 will be able to successfully detect one of these channels.

Figure 6A:
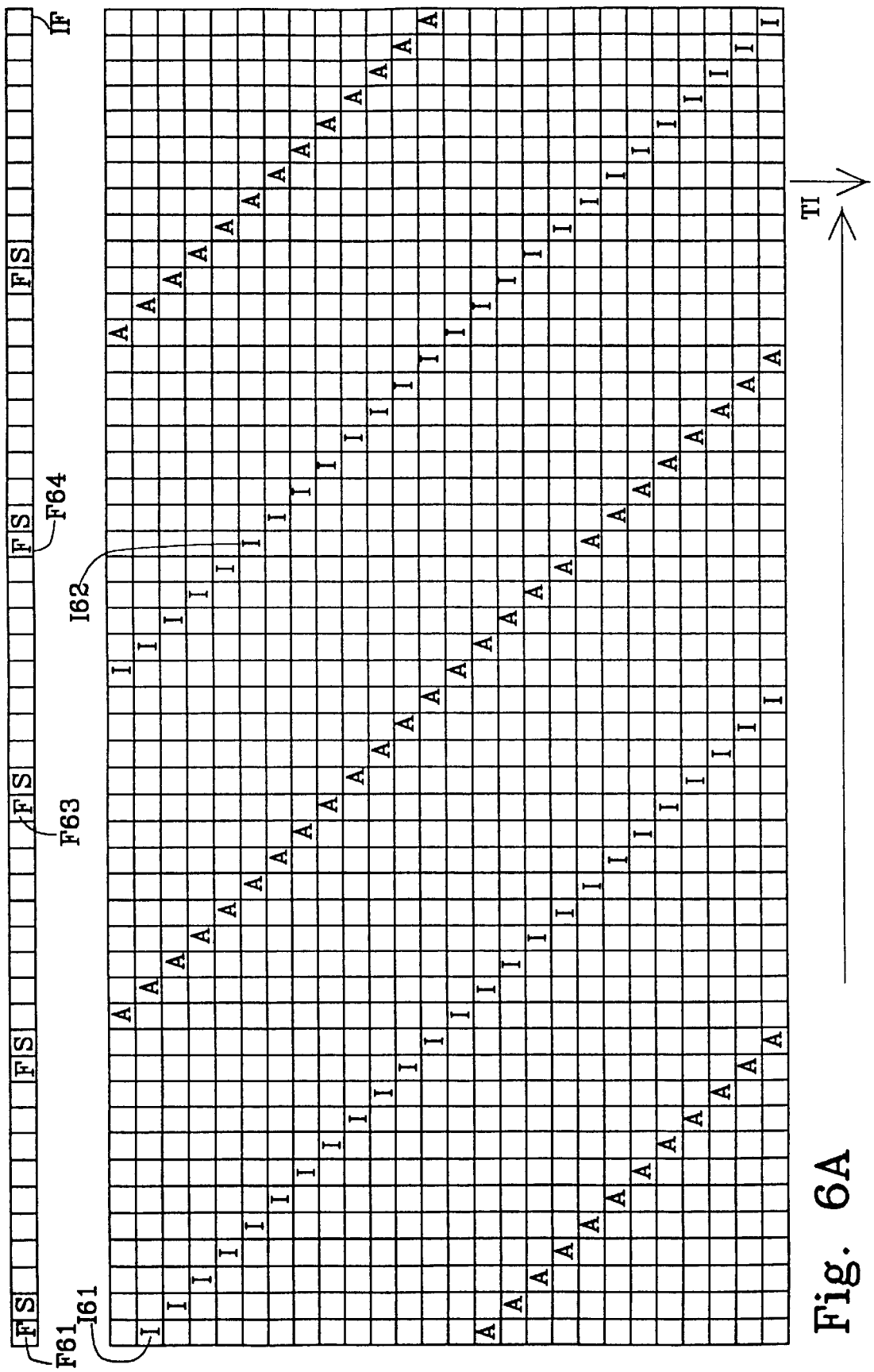
FIG. 6A is a time diagram illustrating the sliding of 51-frame multiframes and 26-frame multiframes relative each other.

FIG. 6A illustrates the mechanism in GSM which ensures that in the time domain TI idle frames, with a common designation I, in the 26-frame multiframe structure carrying the traffic channel and frames in the 51-frame multiframe structure carrying the frequency correction channel, with a common designation F, and synchronization channel, with a common designation S, will coincide in time with regular intervals. Frames in the 26-frame multiframe structure carrying the slow associated control channel have a common designation A.

Both multiframe structures are repeated. For each 51-frame multiframe, the idle frame I in the 26-frame multiframe structure will slide one TDMA frame relative the frames in the 51-frame multiframe structure, due to the arithmetic properties of 26 and 51. The second occurrence of an idle frame I61 in the 26-frame multiframe structure, coincides with a frame F61 in the 51-multiframe structure carrying the frequency correction channel. Nine 26-frame multiframes later once again an idle frame I62 in the 26-frame multiframe structure coincides with a frequency correction channel frame F64. Due to the idle frame IF in the 51-frame multiframe structure, the longest interval between two successive occurences of an idle frame I in the 26-frame multiframe coinciding with a frequency correction channel F frame is eleven 26-frame multiframes. Hence this mechanism ensures that the mobile station is guaranteed to have an opportunity to detect a frequency correction channel within a time period corresponding to eleven 26-frame multiframes.

To shorten the time needed for detection of the frequency correction channel F or synchronization channel S of a neighbouring base tranceiver station, the mobile station needs to have more opportunities to detect and decode these channels than only during the idle frames I in the 26-frame multiframe structure. The present invention provides such opportunities.

Figure 8:
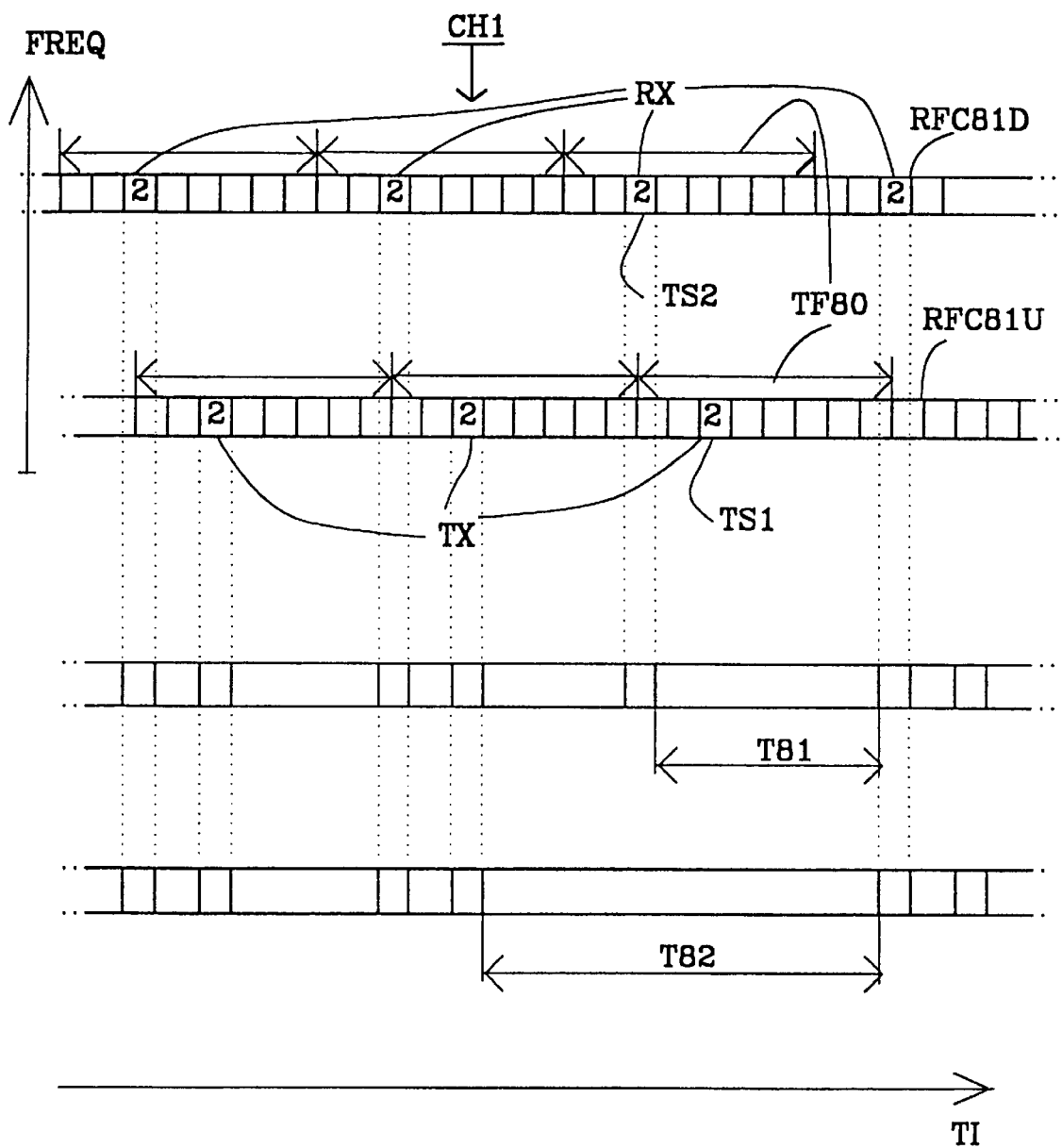
FIG. 8 is a time-frequency diagram illustrating the stealing of time slots from an allocated physical channel in accordance with an examplifying embodiment of the invention.

The basic principle of the method according to the invention is described below with reference to FIGS. 8 and 1. FIG. 8 gives an example of an allocated physical channel CH1, dedicated for communication between a mobile station MS1 (FIG. 1) and the serving base tranceiver station BTS1. In the time domain TI (FIG. 8), the physical channel CH1 comprises time slot two 2 in a sequence of TDMA frames. In the frequency domain FREQ one radio frequency RFC81D is used in the downlink and another radio frequency RFC81U is used in the uplink direction. The mobile station MS1 selects at least one of the time slots TS1 in the succession of time slots 2 comprising the physical channel CH1. In the selected time slot TS1, the mobile station MS1 ignores/blocks communication with the serving base tranceiver station BTS1 on the dedicated physical channel CH1, i.e. depending on if the selected time slot is in the uplink or downlink direction, the mobile station MS1 either omits to transmit or receive a burst in the selected time slot. The mobile station MS1 further selects a radio frequency different from the radio frequency RFC81U associated with the selected time slot TS1 for communication on the dedicated physical channel CH1. In this example, the mobile station MS1 selects the frequency FREQ4 (FIG. 1) used by the second base tranceiver station BTS4 for transmission of the BCCH-carrier BCCH4. The mobile station receives in the selected time slot TS1 signals BCCH4 on the selected frequency FREQ4 from the second base tranceiver station BTS4.

The mobile station MS1 "stealing" a time slot TS1 (FIG. 8) by blocking communication in that time slot TS1, causes a similar effect as if the burst was lost as a result of a transmission error due to interference or noise. If not too many bursts are lost in a short period of time, the channel coding and interleaving arrangements of GSM will enable the information to be recreated at the receiving end. Thus, if the combined effect of real transmission errors due to interference or noise and lost bursts due to the the mobile station MS1 stealing time slots TS1–TS2 do not exceed the capability for error correction provided by the channel coding and interleaving arrangements in GSM, no information is lost.

Blocks of information is transmitted/received in a number of bursts e.g. for a full rate traffic channel carrying speech a 20 ms block of speech is interleaved over eight bursts. In theory, four of those bursts can be lost and a channel decoder at the receiving end can still recreate the lost information. A suitable principle when stealing time slots from the physical channel, is to steal only so many time slots with bursts carrying a certain block of data that the channel decoder with a high probability can recover the lost information even when some additional bursts are lost due to real transmission errors. In the example above this principle means that the mobile station would steal one or two of the eight time slots with bursts carrying the 20 ms block of speech data.

If the mobile station MS1 (FIG. 1) steals a time slot TS1 (FIG. 8) on the uplink, the time interval T81 between the downlink time slots RX immediately before and after this time slot can be used for receiving signals from a second base tranceiver station BTS4. If the mobile station MS1 steals a time slot TS2 on the downlink, the same amount of time would be available. If in a TDMA frame TF80 the mobile station MS1 steals both the downlink TS2 and the uplink TS1 time slot, a longer time interval T82 becomes available for receiving signals from a second base tranceiver station BTS4. This is the same amount of time that is available in an idle frame for detecting and decoding the frequency correction channel or the synchronization channel on a BCCH-carrier.

Figure 6B:
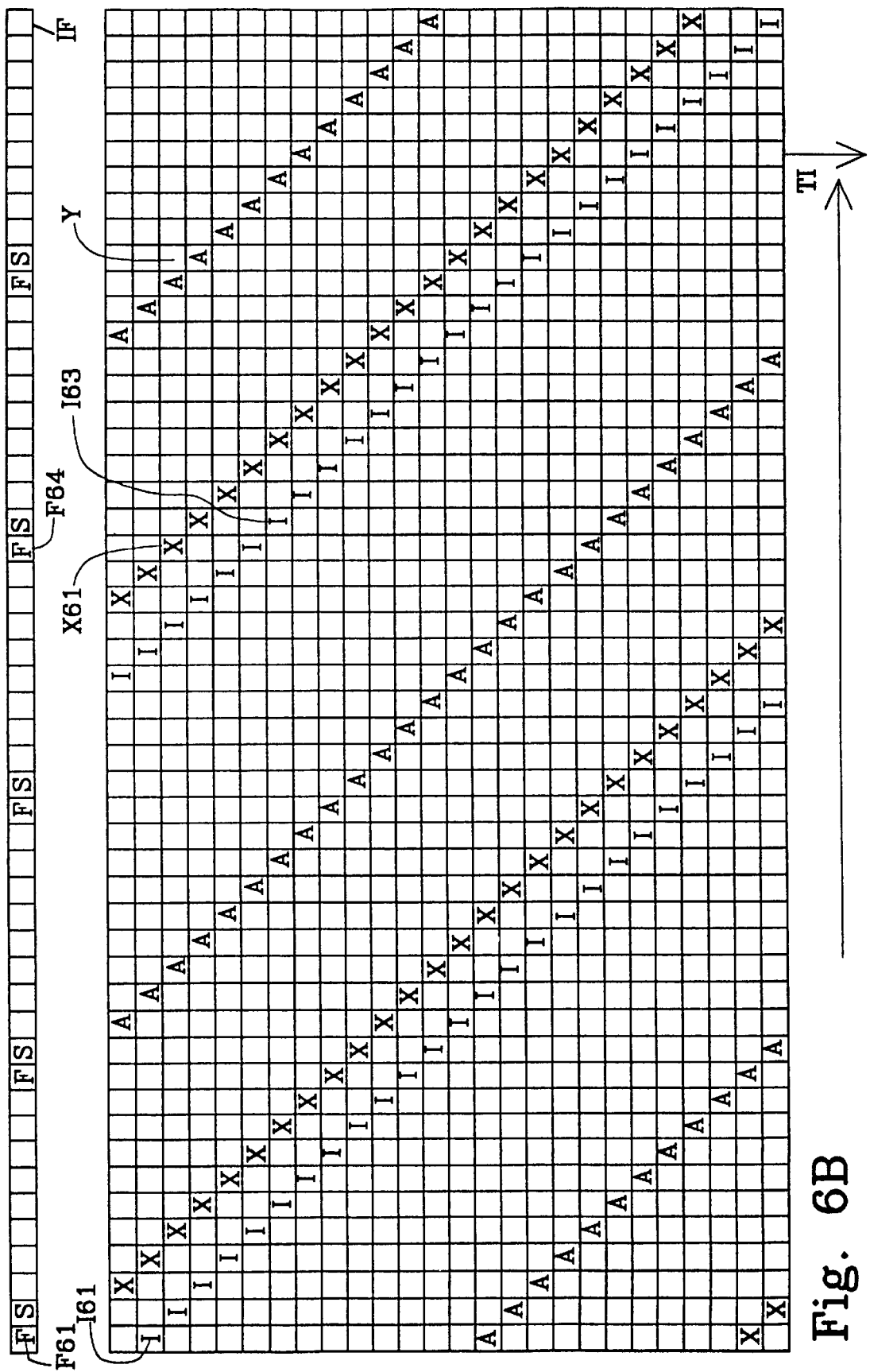
FIG. 6B is a time diagram illustrating the effect of stealing both the downlink and the uplink time slot in the third TDMA frame in each 26-frame multiframe in accordance with an examplifying embodiment of the invention.

FIG. 6B illustrates the effect in the time domain TI when a GSM mobile station according to the invention in every 26-frame multiframe steals both the downlink and uplink time slots in the third TDMA frame, with a common designation X, and uses these TDMA frames together with the idle frames I for detection of the frequency correction channel. As in FIG. 6A, the second occurrence of an idle frame I61 in the 26-frame multiframe structure, coincides in time with a frequency correction channel frame F61 in the 51-frame multiframe structure. The next time it will be possible to detect the frequency correction channel F is in the third TDMA frame X61 in the fourth 26-frame multiframe following that idle frame I61. When both the third TDMA frame X and the idle frame I in each 26-frame multiframe are used for detection of the frequency correction channel F on a BCCH-carrier, the mobile station is guaranteed to have an opportunity to detect and decode the frequency correction channel F within a time period corresponding to six 26-frame multiframes i.e. five 26-frame multiframes less than when only the idle frames I was available for this purpose.

Once the frequency correction channel is detected and decoded in a frame X61, the mobile station does not have to wait for the next idle frame I63 coinciding with a synchronization channel frame S in the 51-frame multiframe structure, but can instead calculate when the next frame Y coinciding with a synchronization channel frame S will occur and if deemed suitable, steal the time slots in that frame Y and use that frame Y to detect and decode the synchronization channel.

In a GSM mobile station according to the invention, the above principles for stealing time slots are preferred.

Figure 7:
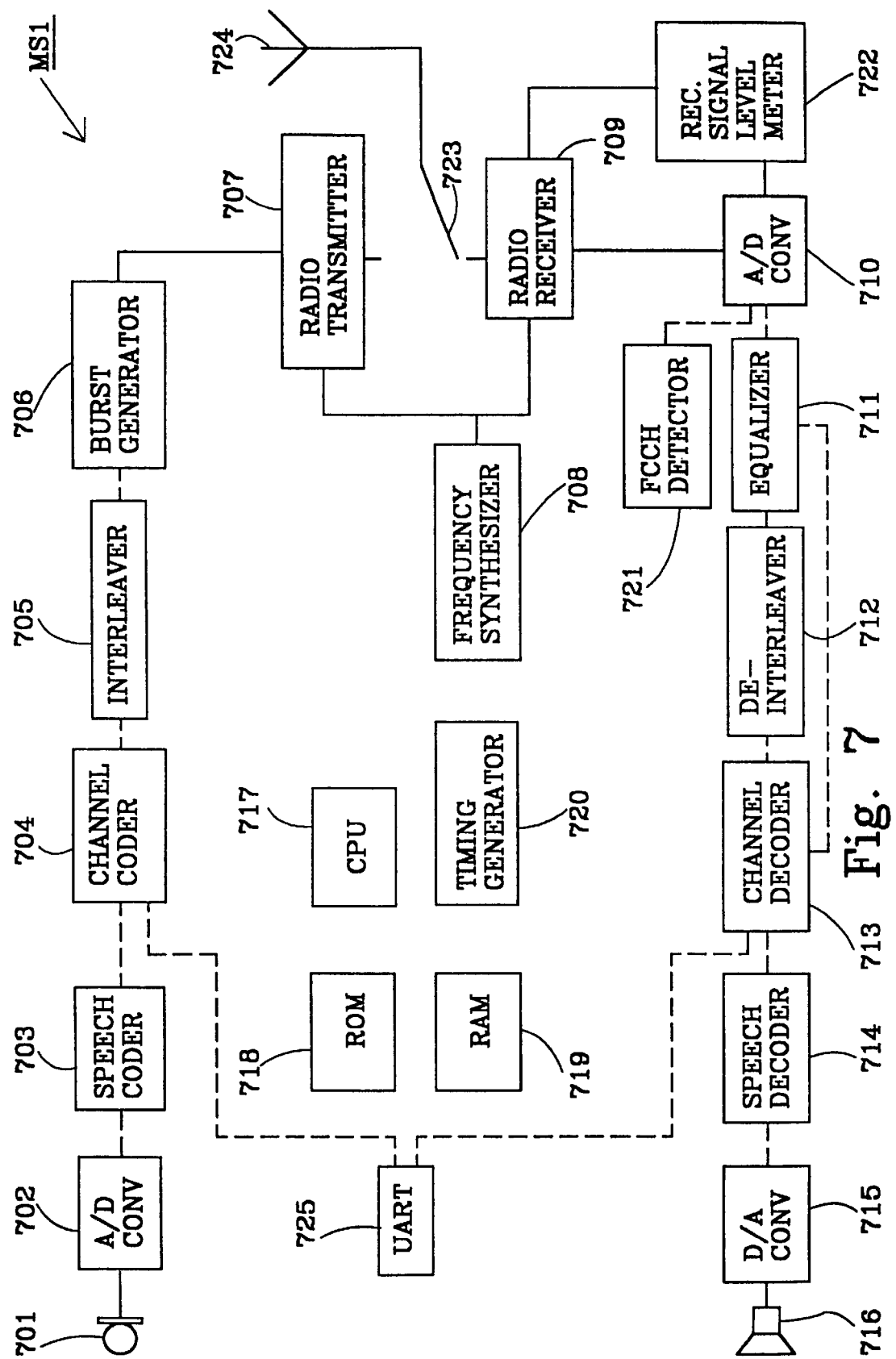
FIG. 7 is a block schematic of a GSM mobile station in accordance with an examplifying embodiment of the invention.

FIG. 7 illustrates a GSM mobile station MS1 according to the invention. The mobile station MS1 comprises:
communication means 703–714, 717–720, 723–724 for communication on a dedicated physical channel with the serving base tranceiver station,
time slot selecting means 717–718 for selecting at least one of the time slots comprising the dedicated physical channel, communication blocking means 717–718 for blocking communication with the serving base tranceiver station in the selected time slot, radio frequency selecting means 708, 717–718 for selecting a radio frequency used by a second base tranceiver station for transmission of a BCCH-carrier, this selected frequency being different from the frequency associated with the selected time slot for communication on the dedicated physical channel, means 708–709, 723–724 for receiving the BCCH carrier signals transmitted by the second base tranceiver station on the selected frequency in the selected time slot, means 721 for detecting and decoding the frequency correction channel carried by said BCCH-carrier, means 713 for detecting and decoding the synchronization channel carried by said BCCH-carrier.

More in detail, the mobile station MS1 comprises a microphone 701 connected to an A/D converter 702 which samples the analogue signal from the microphone at a rate of 8 kHz and represents each sample by 13 bits.

The samples are processed by a speech coder 703 in blocks corresponding to time periods of 20 ms. The speech coder 703 compresses the representation of a 20 ms block from 2080 bits down to 260 bits. For each 20 ms block of data output from the speech coder 703, the speech coder indicates whether the block of data contains speech or only noise, the latter encoded as silence descriptor frames (SID).

A channel coder 704 introduces redundancy into the data flow in order to allow detection or even correction of signal errors introduced during transmission. The 260 bits delivered by the speech coder for each 20 ms block is expanded by the channel coder to code words of 456 bits.

The code words output from the channel coder 704 is interleaved over a number of bursts by an interleaver 705. A 456 bit code word representing a 20 ms block of speech, is diagonally interleaved over 8 consecutive bursts.

A burst generator 706 collects output data from the interleaver that is to be sent in a burst and arranges that information into a proper burst. The output from the burst generator is in the form of an analogue baseband signal.

A radio transmitter 707 converts the baseband signal received from the burst generator 706 to a radio signal by modulating a carrier of a certain radio frequency as determined by a frequency synthesizer 708 and amplifies the modulated radio signal to a suitable power level.

The mobile station MS1 also comprises a radio receiver 709 which receives radio signals on a certain radio frequency as determined by the frequency synthesizer 708. The radio receiver 709 converts the radio signals to an analogue baseband signal.

The analogue baseband signal from the radio receiver 709 is sampled by a second A/D-converter 710. Each sample is represented by amplitude (Received Signal Strength Indicator—RSSI) and phase information.

Data from the A/D-converter is processed by an equalizer 711. The output from the equalizer consists of the estimated contents of the received burst and an indication of the reliability of that estimation for each bit of the burst.

A deinterleaver 712 collects data from several bursts and performs the reverse operation of the interleaver 705. Output from the deinterleaver 712 consists of 456 bit code words and an indication of the reliability of each bit.

A channel decoder 713 performs error detection and correction on the output data from the deinterleaver 712. In that process the reliability of each bit is taken into account. Output from the channel decoder 713 consists of 260 bit data blocks, an estimation of the number of bit errors in the data block and an indication on whether the data block contains speech or noise information i.e. a SID frame.

A speech decoder 714 performs the reverse operation of the speech coder 703 and expands the 260 bits into 2080 bits of data which is consumed by a D/A-converter 715 running at a rate of 8 kHz to generate an analogue signal which in turn is used by an earphone 716 to generate sound. Each time noise information is received, the speech decoder 714 stores that information for subsequent use when generating noise.

The mobile station MS1 furthermore comprises a Central Processing Unit (CPU) 717 which executes program instructions stored in a Read Only Memory (ROM) 718. The CPU 717 is responsible for the overall control of the mobile station and controls the other units in the mobile station in accordance with the program instructions.

Results in the form of digital data produced by the different units are exchanged via Random Access Memory (RAM) 719, e.g output from the speech coder 703 is stored in the RAM 719 and the channel coder 704 retrieves its input data from the RAM 719.

Program instructions for the CPU 717 and permanent data are stored in read only memory (ROM) 718.

A timing generator 720 contains a set of counters, T1, T2, T3 and QB used as a time reference in the mobile station. These counters are running continuously when the mobile station is powered on. Counters T1, T2 and T3 represents the TDMA frame number in reduced format (see e.g. GSM 05.02) and the quarter bit counter QB is used to represent timing within a TDMA frame with a resolution of 0.25 bit periods. When the mobile station is being synchronized to a neighbouring base tranceiver station, the frequency correction channel and synchronization channel carried by the BCCH-carrier transmitted by that base tranceiver station is detected and decoded and the timing of that base tranceiver station is stored in RAM 719, represented as a set of delta values, delta-T1, delta-T2, delta-T3 and delta-QB, relative to the counters T1, T2, T3 and QB respectively. The timing generator 720 can also be programmed by the CPU 717 to generate interrupt signals to the CPU 717 at certain points in time. Yet another feature offered by the timing generator, is that for time critical functions such as causing the radio transmitter 707 to transmit a burst in a certain time slot, the timing generator 720 can be programmed by the CPU 717 to generate strobe signals to the unit performing the function, ordering the unit to start/stop performing the function.

The data bus for exchange of data between the different units and memory 718–719 as well as the control bus enabling the CPU 717 to control the different units are not shown in FIG. 7. As stated previous, data exchange between the different units involves storing data in and reading data from the RAM 719. The logical data flows between units are indicated with dashed lines.

In order to enable e.g. fax transmission or file transfer to a PC connected to the mobile station MS1, the mobile station comprises an Universal Asynchronous Receiver and Transmitter (UART) 725. Data that is to be transmitted flows from the UART 725 to the channel coder 704 while received data flows from the channel decoder 713 to the UART. The exact details for channel coding and interleaving of data is a bit different from channel coding and interleaving of fullrate speech, but the basic principles are the same. GSM technical specification 05.03 contains the detailed information on channel coding and interleaving in GSM.

When a call has been established to or from the mobile station MS1, a dedicated physical channel CH1 (FIG. 1) has been allocated for communication between the mobile station MS1 and the serving base tranceiver station BTS1.

For each TDMA frame in the sequence of TDMA frames defining the allocated physical channel CH1 (FIG. 8), the mobile station MS1 receives a normal burst in the allocated timeslot RX on the downlink, transmits a normal burst in the allocated timeslot TX on the uplink and measures the signal strength of one of the BCCH-carrier BCCH2–BCCH5 (FIG. 1) in the BCCH Allocation list.

Receiving a burst is executed by the CPU 717 ordering the frequency synthesizer 708 to tune to the radio frequency RFC81D (FIG. 8) carrying this burst and ordering the radio receiver 709 and the second A/D-converter 710 to receive and sample the burst during the receive time slot RX.

When stealing a time slot TS2 (FIG. 8) in the downlink direction, none of the above steps for receiving a burst is carried out. In order to simulate that a burst has been received, the CPU 717 orders the deinterleaver 712 to read a burst stored in ROM 718. This stored burst corresponds to the output from the equaliser 711 when a totally useless burst has been received i.e. each bit is marked with a reliability indicator stating that the bit is totally unreliable. This will result in the channel decoder 713 completely ignoring these bits.

Transmitting a burst is executed by the CPU 717 ordering the frequency synthesizer 708 to tune to the radio frequency RFC81U (FIG. 8) that is to carry this burst, ordering the switch 723 to connect the radio transmitter 707 to the antenna 724 and ordering the burst generator 706 and radio transmitter 707 to transmit the burst during the transmit time slot TX.

When stealing a time slot TS1 (FIG. 8) in the uplink direction none of the above steps for transmitting a burst is carried out. For this time slot, the CPU 717 omits to order the burst generator 706 to generate a burst from the data output by the interleaver 705.

Measuring the signal strength of one of the BCCH-carriers BCCH4 (FIG. 1) in one of the neighbouring cells C4 is executed by the CPU 717 ordering the frequency synthesizer 708 to tune to the frequency FREQ4 of the BCCH-carrier BCCH4, ordering the radio receiver 709 to start receiveing and after a certain time ordering the second A/D-converter 710 to sample the received signal strength meter 722.

When a TDMA frame is used to monitor a BCCH-carrier BCCH4 (FIG. 1) for the frequency correction channel, the CPU 717 orders the frequency synthesizer 708 to tune to the frequency FREQ4 of the BCCH-carrier BCCH4 that is to be monitored. The radio receiver 709 is started and receives data during the complete TDMA frame. Data is converted into digital format by the A/D-converter 710 and processed by the FCCH detector 721. The results from the FCCH detector 721 indicating the probability that a frequency correction burst has been detected and timing information relating to that burst is stored in RAM 719. After six 26-frame multiframes for which data has been collected and processed by the FCCH detector 721 in both the third TDMA frame and the idle frame, the CPU 717 performs an analysis of the results stored in RAM 719 to determine whether a frequency correction burst has been received. If no frequency correction burst has been found, the monitored radio carrier is considered as not being a BCCH-carrier and all signal strength measurement results related to this carrier are deleted. If a frequency correction burst is considered to have been received, the CPU 717 will decide in what frame the mobile station MS1 shall monitor the BCCH-carrier BCCH4 for the synchronization channel.

When a TDMA frame is used to monitor a BCCH-carrier BCCH4 (FIG. 1) for the synchronization channel, the CPU 717 orders the frequency synthesizer 708 to tune to the frequency of the BCCH-carrier BCCH4 that is to be monitored. The radio receiver 709 is started and receives data for the duration of the complete TDMA frame. Data is converted into digital format by the A/D-converter 710. The equalizer 711 and channel decoder 713 are ordered by the CPU 717 to process the output data from the A/D-converter 710 in search for a synchronization burst. The results from the channel decoder 713 indicate whether a synchronization burst was detected, and if so the results also contain the decoded TDMA frame number and base tranceiver station identity code (BSIC). If no synchronization burst was detected, the radio carrier is considered not to be a BCCH-carrier and all data, such as signal strength measurement results, related to this carrier is deleted.

Figure 9A:
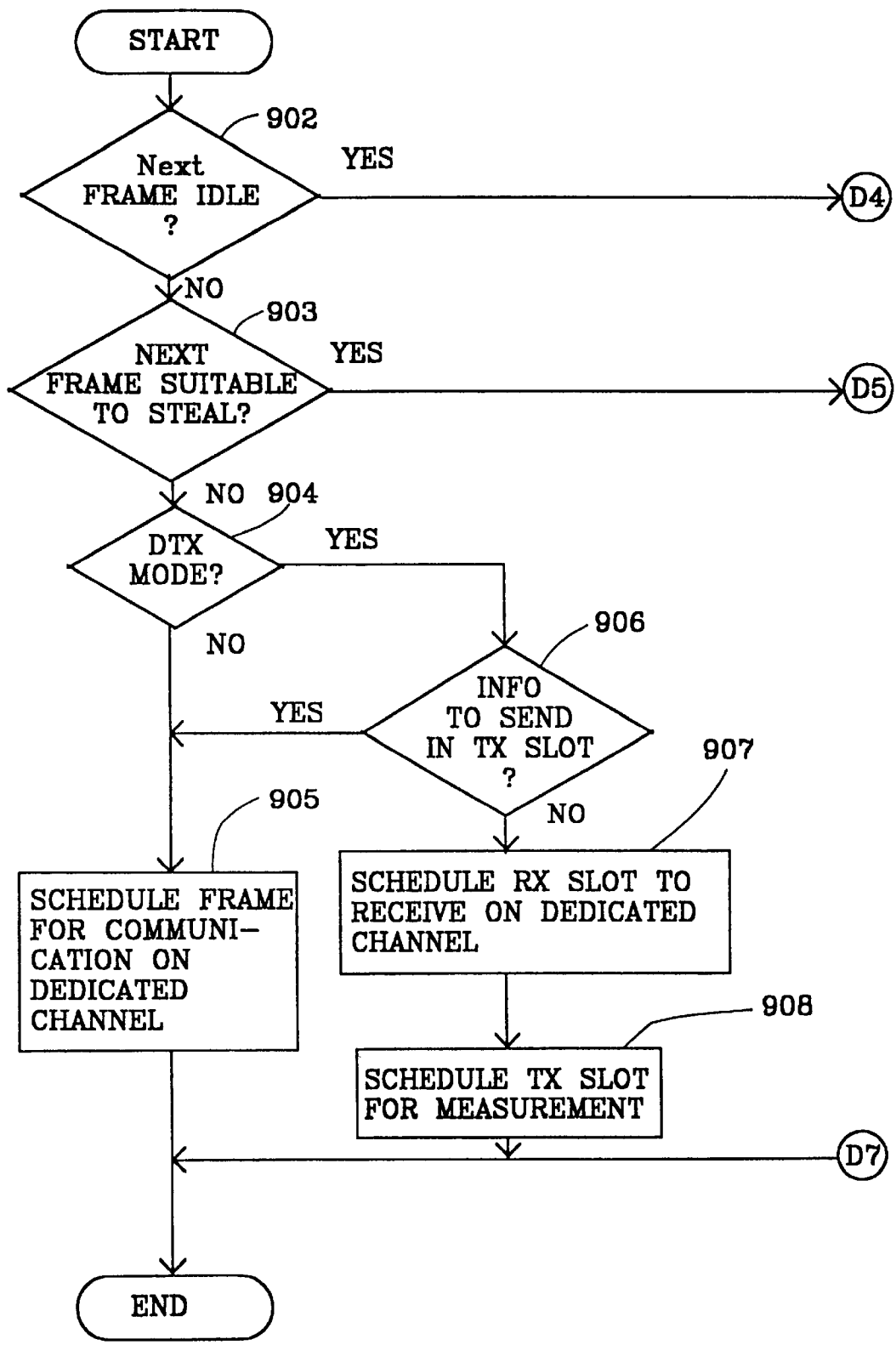
FIGS. 9A, 9B and 9C are flowcharts illustrating the scheduling of TDMA frames in a GSM mobile station according to FIG. 7.
Figure 9B:
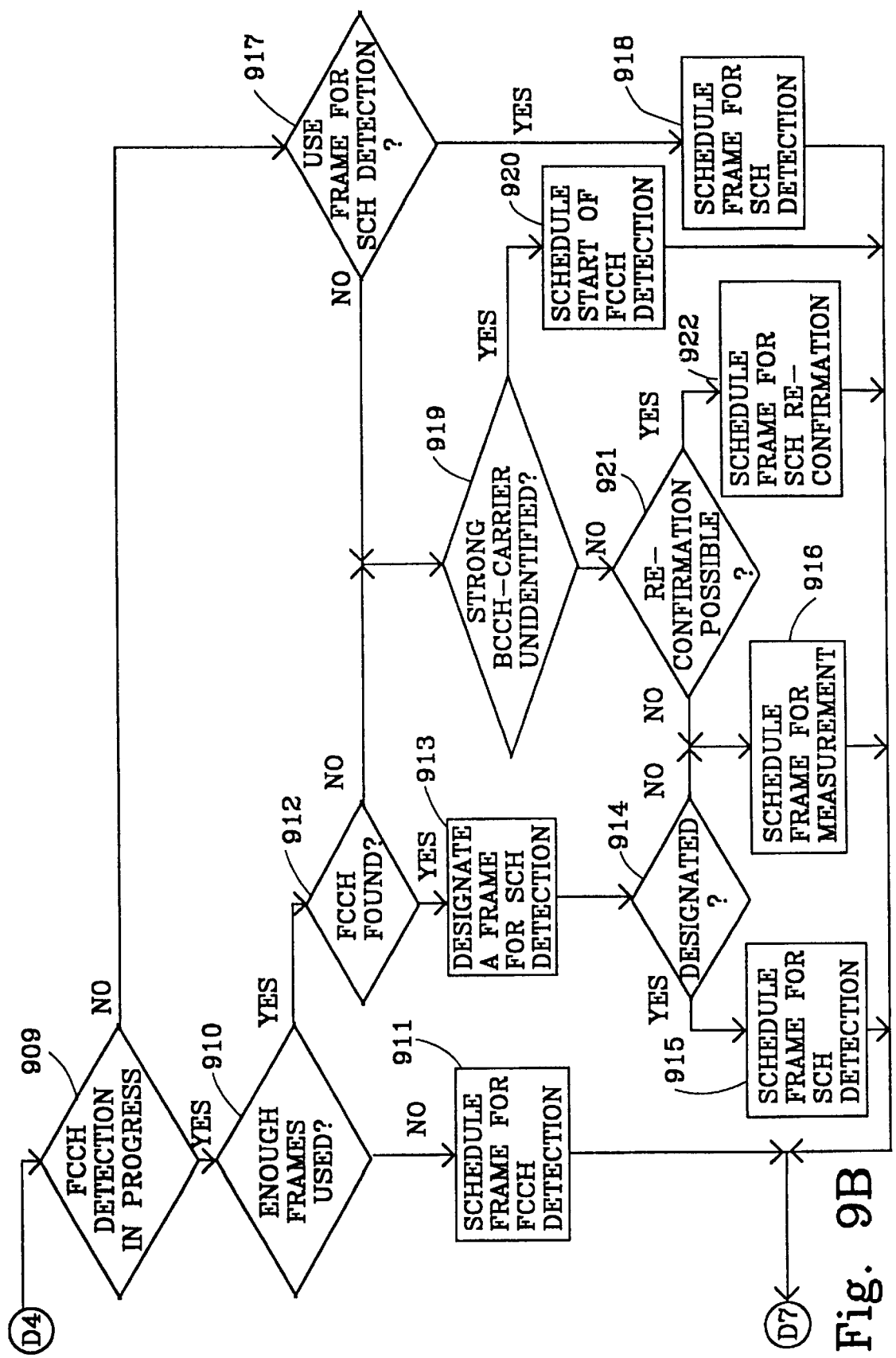
Figure 9C:
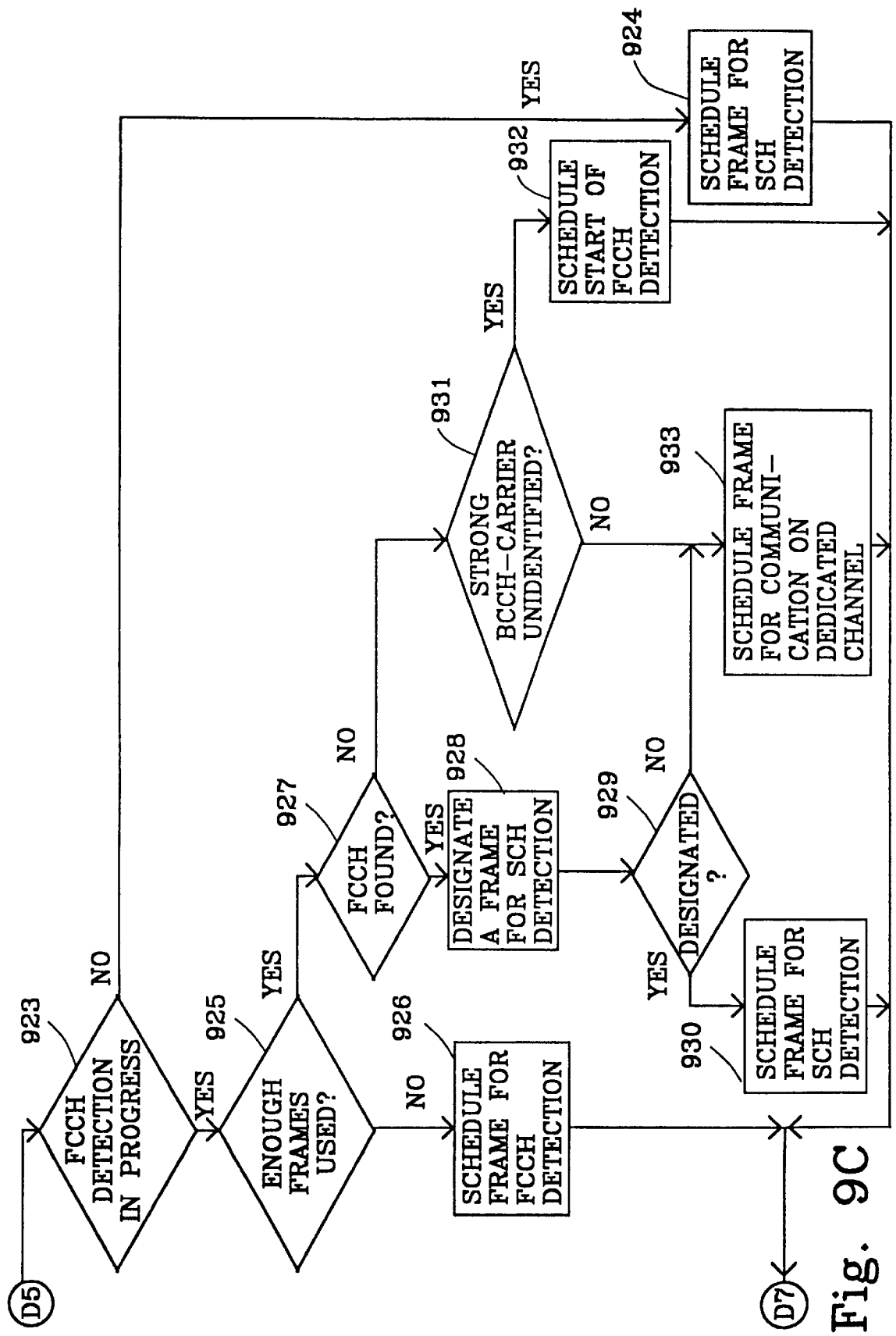

The timing generator 720 is programmed to interrupt the CPU 717 once in each TDMA frame. The CPU 717 decides on how the next TDMA frame is to be scheduled. FIGS. 9A, 9B and 9C illustrates the steps carried out by the CPU 717 when scheduling TDMA frames in a mobile station MS1 according to FIG. 7.

FIG. 9A illustrates how for each upcoming TDMA frame, it is determined in Step 902 whether the frame is idle or not. If the frame is not idle (alternative NO), a check is made in Step 903 whether the next frame is suitable to steal. A frame is suitable to steal if it is th e third TDMA frame in a 26-frame multiframe or the frame has been designated for synchronization channel detection. If t he frame is not suitable to steal (alternative NO), a check is made in Step 904 whether the mobile station is working in DTX mode (Discontinous transmission). If the mobile station is not working in DTX mode (alternative NO), the frame is scheduled in Step 905 for reception and transmission on the allocated dedicated physical channel CH1 (FIG. 1) followed by signal strength measurement on one of the BCCH-carriers BCCH2–BCCH5 in the BCCH allocation list.

If the mobile station is working in DTX mode (alternative YES) a check is made in Step 906 whether there is information to transmit. If there is information to transmit (alternative YES), the frame is scheduled in Step 905 as described in the previous section. If there is no information to transmit (alternative NO), i.e. the information that is in turn to be transmitted consist only of noise information, no transmission will occur in the TDMA frame. In Step 907, reception on the allocated dedicated physical channel CH1 is scheduled as usually, but after the receive time slot, the rest of the TDMA frame is scheduled in Step 908 for signal strength measurement allowing measurement of more than one BCCH-carrier BCCH2–BCCH5 in the BCCH Allocation list.

FIG. 9B illustrates how, if it was decided in Step 902 (FIG. 9A) that the next frame is an idle frame (alternative YES), a check is made in Step 909 to determine whether a frequency correction channel detection on a certain BCCH-carrier BCCH4 is in progress. If such a detection is in progress (alternative YES), a check is made in Step 910 whether enough idle frames and stolen frames, corresponding to the time needed to guarantee that in one of these frames the mobile station MS1 will have had an opportunity to detect the frequency correction channel i.e. six 26-frame multiframes, have been used for this detection. If less than six 26-frame multiframes have been used (alternative NO), the next frame is scheduled in Step 911 for continued frequency correction channel detection. If six 26-frame multiframes have been used for the detection in progress (alternative YES), the results from the FCCH detector is analysed in Step 912 to determine if a frequency correction burst has been found. If a frequency correction burst has been found (alternative YES), a suitable frame is designated in Step 913 for detection of the synchronization channel carried by this BCCH-carrier BCCH4. The criteria for designating a frame for this purpose, in addition to the TDMA frame coinciding with a synchronization channel frame in the 51-frame multiframe structure on said BCCH-carrier BCCH4, is that the frame is not used by the slow associated control channel. A check is made in Step 914 whether it is the next frame that is designated for synchronization channel detection, in which case (alternative YES) in Step 915 that frame is scheduled accordingly. If the next frame is not designated for synchronization channel detection (alternative NO), the complete frame is scheduled in Step 916 for signal strength measurements allowing measurement of a number of BCCH-carrier BCCH2–BCCH5 in the BCCH Allocation list.

If it was decided in Step 909 that no frequency correction channel detection is in progress (alternative NO) a check is made in Step 917 whether the frame is designated for synchronization channel detection. If so (alternative YES), the idle frame is scheduled for that purpose in Step 918.

If it was determined in Step 917 that the frame is not designated for synchronization channel detection (alternative NO), or if the check in Step 912 indicates that the frequency correction channel detection have been completed unsuccessfully (alternative NO), the idle frame is available for starting a new frequency correction channel detection or performing reconfirmation of the synchronization channel on BCCH-carriers for whom the synchronization channel have been detected and decoded previously.

A check is made in Step 919 whether there is an unidentified BCCH-carrier BCCH3 among the six strongest BCCH-carriers. If so (alternative YES), a new frequency correction channel detection is started for that BCCH-carrier BCCH3 and in Step 920 the frame is scheduled accordingly.

If there is no unidentified BCCH-carrier among the six strongest BCCH-carriers (alternative NO), the timing information stored for the already identified BCCH-carriers is checked in Step 921 to determine whether the frame can be used for reconfirmation of the synchronization channel on any of those BCCH-carriers. If reconfirmation is possible for one of the BCCH-carriers BCCH2 (alternative YES), the frame is scheduled in Step 922 for synchronization channel detection on that BCCH-carrier BCCH2. If no synchronization channel reconfirmation is possible (alternative NO), the frame is scheduled for signal strength measurements in Step 916.

FIG. 9C illustrates how, if it was decided in Step 903 (FIG. 9A) that the next frame is suitable to steal (alternative YES), a check is made in Step 923 to determine whether a frequency correction channel detection is in progress. If no such detection is in progress (alternative NO), this implies that the reason why the frame is considered as suitable to steal is that the frame is designated for synchronization channel detection, and the frame is scheduled in Step 924 for that purpose.

If a frequency correction channel detection is in progress (alternative YES), a check is made in Step 925 whether idle frames and stolen frames during six 26-frame multiframes have been used for this detection. If less than six 26-frame multiframes have been used (alternative NO), the next frame is scheduled in Step 926 for continued frequency correction channel detection. If six 26-frame multiframes have been used for the detection in progress (alternative YES), the results from the FCCH detector are analysed in Step 927 to determine if a frequency correction burst has been found. If a frequency correction burst has been found (alternative YES), a suitable frame is designated in Step 928 for detection of the synchronization channel according to criterion described above. A check is made in Step 929 whether it is the next frame that was just designated for synchronization channel detection, in which case (alternative YES) the next frame in Step 930 is scheduled for that purpose.

If the check in Step 927 indicated that the frequency correction channel detection was completed unsuccessfully (alternative NO), a check is made in Step 931 whether there is an unidentified BCCH-carrier among the six strongest BCCH-carriers. If so (alternative YES), a new frequency correction channel detection is started for that BCCH-carrier and the frame is scheduled in Step 932 accordingly.

In the event that the check in Step 931 indicated that there is no unidentified BCCH-carrier among the six strongest BCCH-carriers (alternative NO), or if the check in Step 929 indicated that the next frame is not designated for synchronization channel detection (alternative NO), there is no reason to steal the next frame and in Step 930 the frame is scheduled for communication on the allocated dedicated physical channel i.e. the downlink and uplink time slots are used for communication on the dedicated physical channel as usual.

The invention can be varied in a number of different ways.

Different principles can be applied for how time slots for blocking communication are selected.

In the embodiment described above time slots are selected in a way that the channel decoder at the receiving end with a high probability can recover the lost information even when some additional bursts are lost due to real transmission errors.

Another example of a principle that can be applied when the mobile station is using the radio link protocol (RLP) for communicating data, would be to rely on the repetition-when-needed correction scheme offered by this protocol. Since if data is lost, the RLP protocol will request retransmission of the missing data, time slots can be selected without considerations that the channel coder should be able to recreate the lost information.

The invention can also be applied to networks of other types than of GSM-type or of a type derived from GSM, if communication units in such networks, when communicating on a dedicated communication channel with a first base station, need some extra time for receiving signals from a second base station.

The basic principle of the channel organization of such a network needs to be based on a combination of Time Division Multiple Access and Frequency Division Multiple Access. Apart from that the channel organisation can be varied in many different ways.

The signals received by the communication unit can be used for several different purposes e.g. synchronization of the mobile station with the second base station, identification of the second base station or measuring the signal strength of signals transmitted by the second base station.

We claim:

1. A method in a radio communication network (NET1; FIG. 1)using a combination of time division multiple access and frequency division multiple access, the network (NET1) comprising at least two radio base stations (BTS1, BTS4) and a communication unit (MS1) for radio communication with said base stations (BTS1, BTS4), the method comprising the steps of:

allocating a communication channel (CH1) dedicated for communication between a first one of said base stations (BTS1) and the communication unit (MS1), the communication channel comprising a predetermined succession of time slots (2; FIG. 8), each time slot being associated with a predetermined radio frequency (RFC81D, RFC81U) reserved for communication on said communication channel (CH1) during said time slot (2);

characterizd by, in the communication unit (MS1), selecting at least one of said time slots (TS1);

blocking communication with said first base station (BTS1) on said dedicated communication channel (CH1) in said selected time slot (TS1);

selecting a radio frequency (FREQ4) different from the radio frequency (RFC81U) associated with said selected time slot(TS1);

receiving signals (BCCH4) from a second one of said base stations (BTS4) on the selected radio frequency (FREQ4) in said selected time slot(TS1).

2. A method according to claim 1, characterized by synchronizing the communication unit (MS1; FIG. 1) with said second base station (BTS4) by means of said signals (BCCH4) received from this second base station (BTS4).

3. A method according to claim 1, characterized by identifying said second base station (BTS4; FIG. 1) by means of said signals (BCCH4) received from this second base station (BTS4).

4. A method according to claim 1, characterized by measuring the signal strength of said signals (BCCH4; FIG. 1) received from said second base tranceiver station (BTS4).

5. A method according to claim 1, the communication network (NET1; FIG. 1) being of GSM-type or of a type derived from GSM, the base stations being base tranceiver stations (BTS1, BTS4) and the communication unit being a mobile station (MS1), characterized in that the radio frequency (FREQ4) that is selected is used by the second base tranceiver station for transmission of a BCCH-carrier (BCCH4), said BCCH-carrier (BCCH4) carrying a frequency correction channel (FCCH; FIG. 4) and a synchronization channel (SCH).

6. A method according to claim 5 characterized by detecting and decoding said frequency correction channel (FCCH; FIG. 4) carried by said BCCH-carrier(BCCH4; FIG. 1).

7. A method according to claim 5, characterized by detecting and decoding said synchronization channel (SCH; FIG. 4) carried by said BCCH-carrier (BCCH4; FIG. 1).

8. A communication unit (MS1; FIG. 1) for communication with radio base stations (BTS1–BTS5) in a radio communication network (NET1) using a combination of time division multiple access and frequency division multiple access, said communication unit (MS1) comprising:

communication means (703–714, 717–720, 723–724; FIG. 7) for communication with a first one of said base stations (BTS1) on a dedicated communication channel (CH1), the communication channel (CH1) comprising a predetermined succession of time slots (2; FIG. 8), each time slot being associated with a predetermined radio frequency (RFC81D, RFC81U) reserved for communication on said communication channel (CH1) during said time slot, characterized in that the communication unit further comprises:

time slot selecting means (717–718) for selecting at least one of said time slots (TS1);

communication blocking means (717–718) for blocking communication with said first base station (BTS1) in said selected time slot (TS1);

radio frequency selecting means (708, 717–718) for selecting a radio frequency (FREQ4) different from said radio frequency (RFC81U) associated with said selected time slot (TS1);

means (708–709, 723–724) for receiving radio signals (BCCH4) from a second one of said base stations (BTS4) on said selected radio frequency (FREQ4) in said selected time slot (TS1).

9. A communication unit (MS1; FIG. 1) according to claim 8, characterized in that the communication unit (MS1) comprises synchronization means (713, 721, 717–720; FIG. 7), for synchronizing the communication unit (MS1) with said second base station (BTS4) by means of said signals (BCCH4) received from this second base station (BTS4).

10. A communication unit (MS1; FIG. 1) according to claim 8, characterized in that the communication unit (MS1) comprises means (713; FIG. 7) for identifying said second base station (BTS4) by means of said signals (BCCH4) received from this second base station (BTS4).

11. A communication unit (MS1; FIG. 1) according to claim 8, characterized in that the communication unit (MS1) comprises means (722; FIG. 7) for measuring the signal strength of said signals (BCCH4) received from said second base station (BTS4).

12. A communication unit (MS1; FIG. 1) according to claim 8, the network being of GSM-type or of a type derived from GSM, the communication unit being a mobile station (MS1) and the base stations being base tranceiver stations (BTS1–BTS5), characterized in that said radio frequency selecting means (708, 717–718; FIG.7) is adapted to select the radio frequency (FREQ4) used by the second base tranceiver station (BTS4) for transmission of a BCCH-carrier (BCCH4), said BCCH-carrier (BCCH4) carrying a frequency correction channel (FCCH; FIG. 4) and a synchronization channel (SCH).

13. A communication unit (MS1; FIG. 1) according to claim 12, charaterized in the mobile station (MS1) comprising means (721; FIG. 7) for detecting and decoding the frequency correction channel (FCCH; FIG. 4) carried by said BCCH-carrier (BCCH4).

14. A communication unit (MS1; FIG. 1) according to claim 12, characterized in the mobile station (MS1) comprising means (721; FIG. 7) for detecting and decoding the synchronization channel (SCH; FIG. 4) carried by said BCCH-carrier (BCCH4).

* * * * *